Sept. 10, 1929.  E. LANGLANDS ET AL  1,727,721
MOTOR VEHICLE
Filed April 2, 1927  8 Sheets-Sheet 1

Inventors.
George W. Toombs,
Eric Langlands,
by Spear, Middleton Donaldson Hoep
Attys.

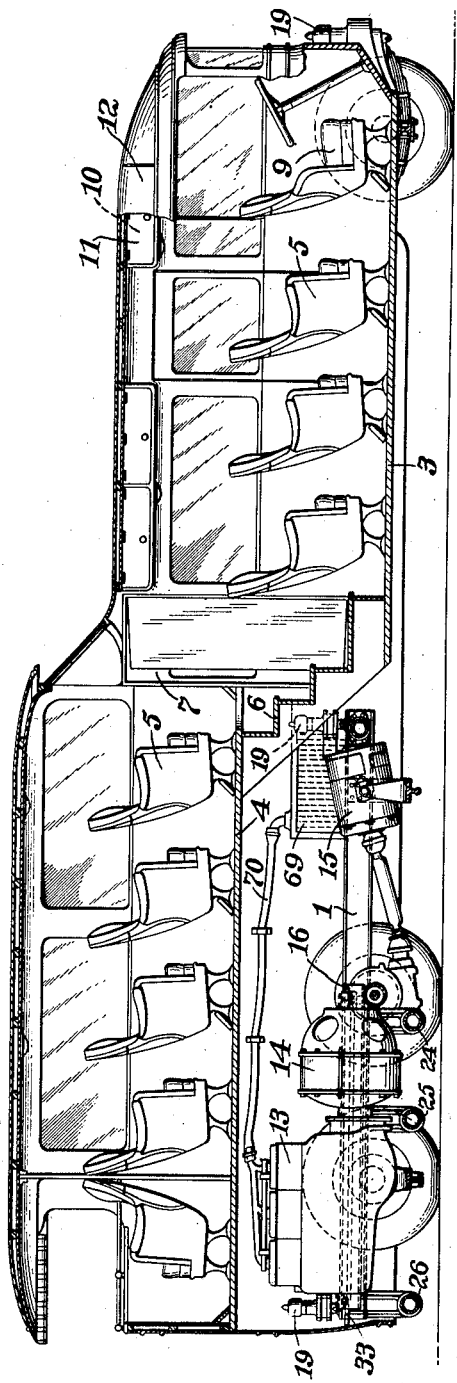

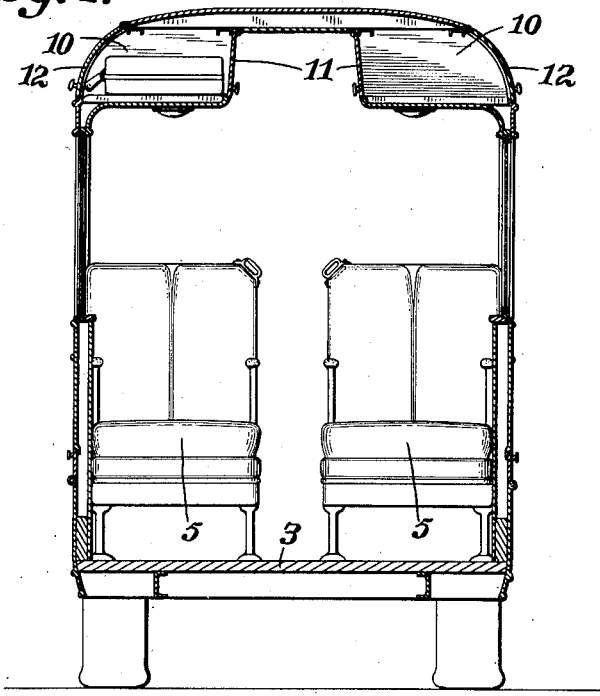
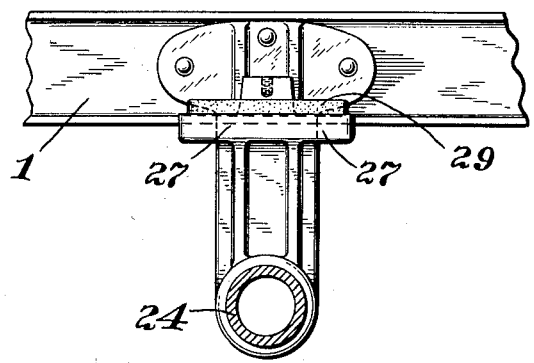

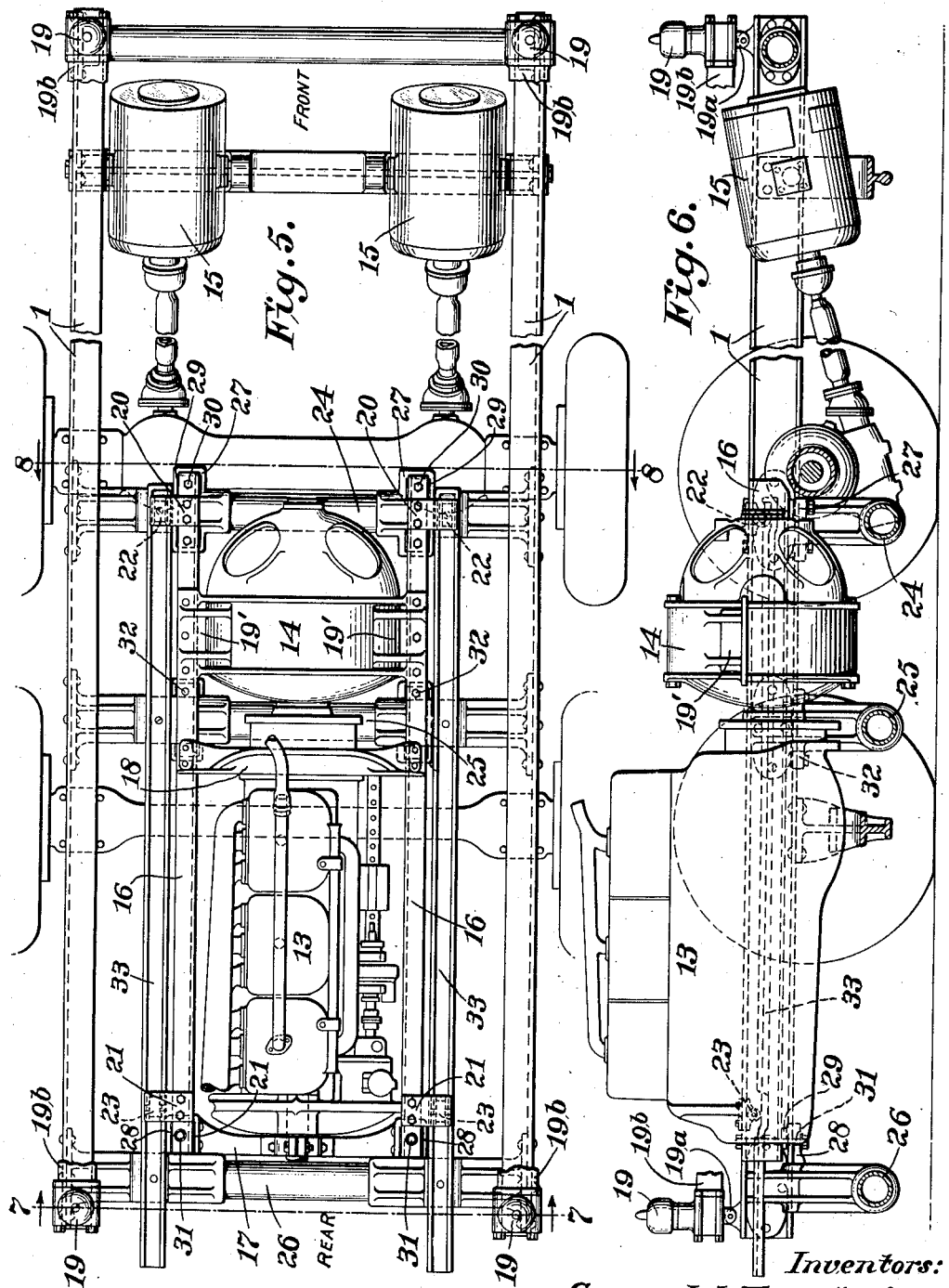

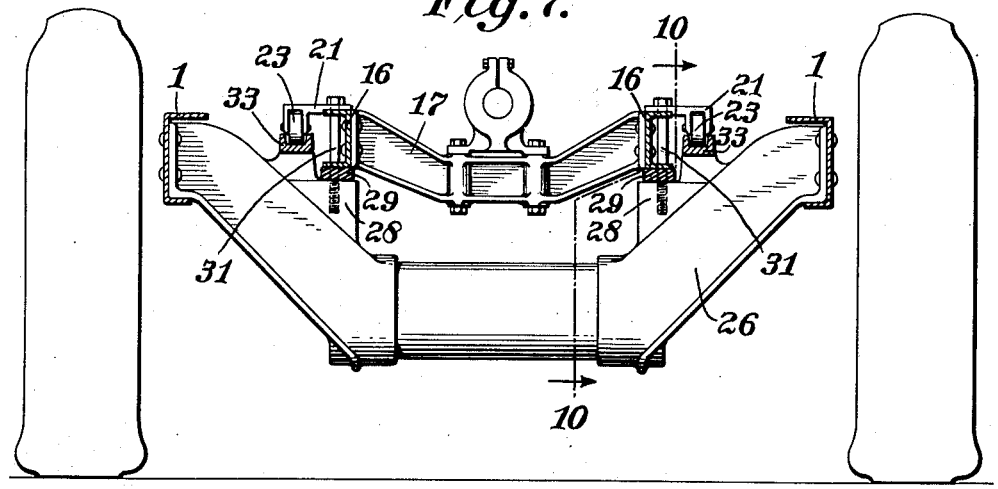
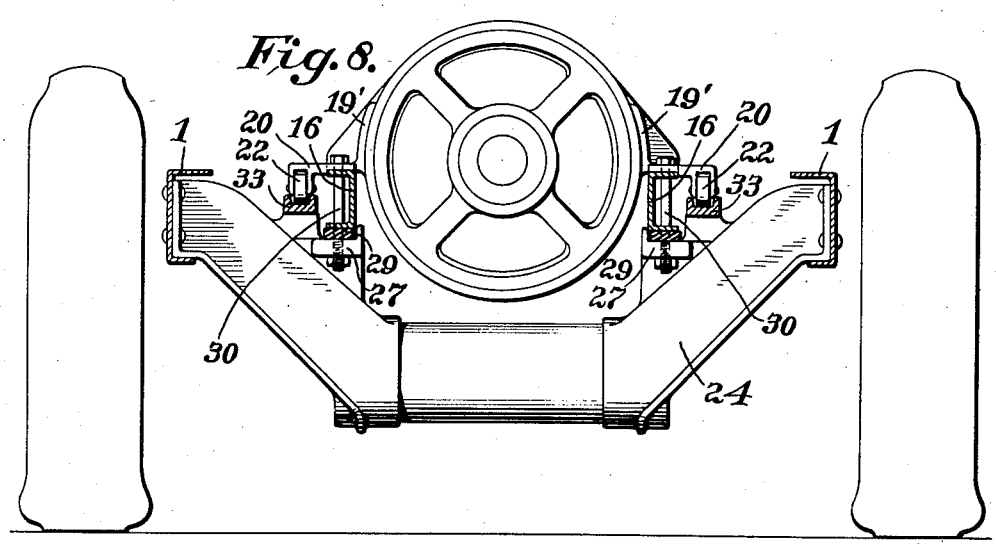
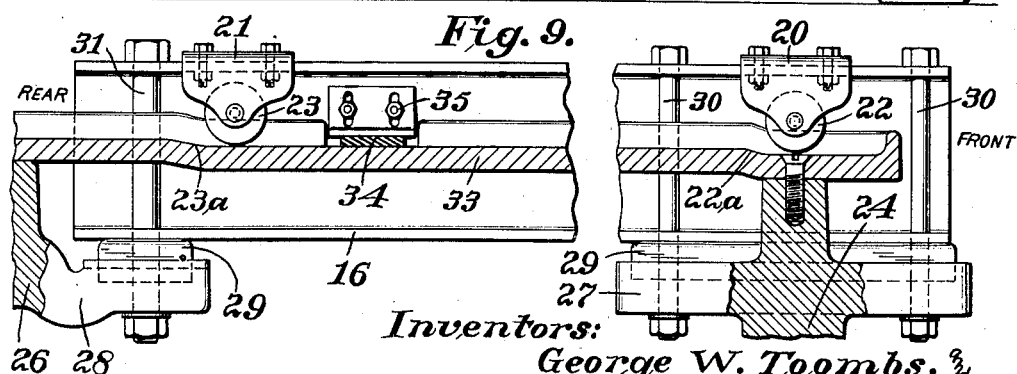

Inventors:
George W. Toombs,
Eric Langlands,
by Spear, Middleton Donaldson, Hall
Attys.

Sept. 10, 1929.   E. LANGLANDS ET AL   1,727,721
MOTOR VEHICLE
Filed April 2, 1927   8 Sheets-Sheet 7

Inventors:
George W. Toombs,
Eric Langlands,
by Spear, Middleton, Donaldson Hall
Attys.

Sept. 10, 1929.  E. LANGLANDS ET AL  1,727,721
MOTOR VEHICLE
Filed April 2, 1927   8 Sheets-Sheet 8
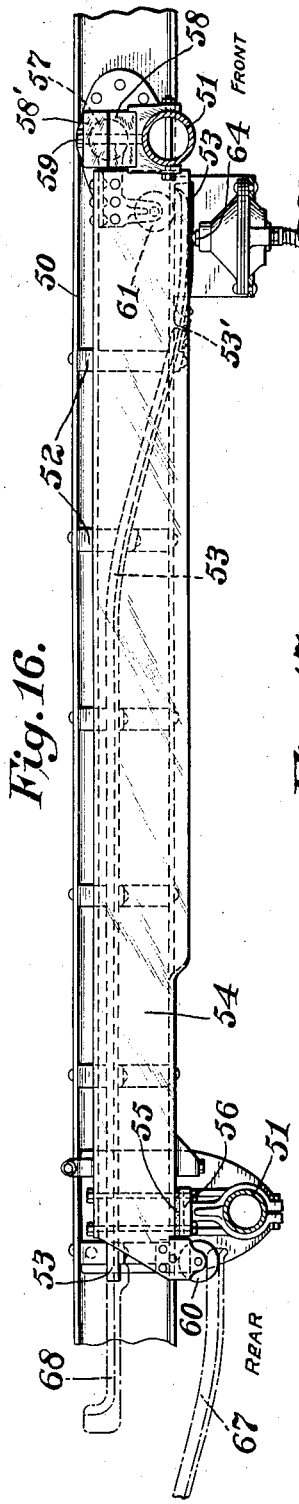
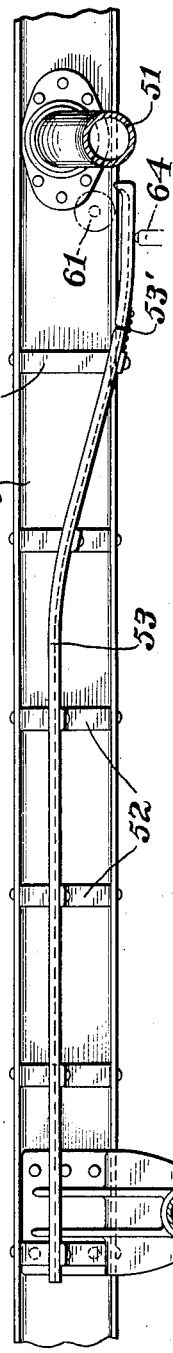
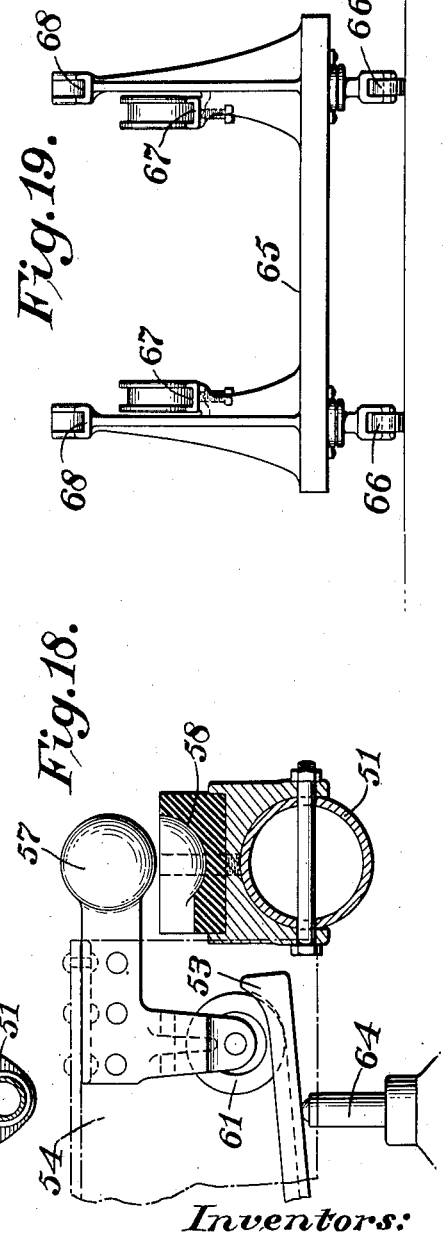
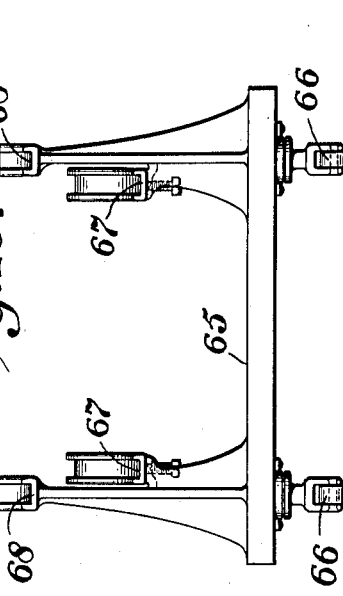
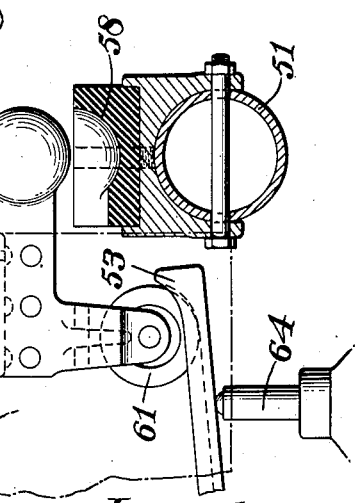
Inventors:
George W. Toombs,
Eric Langlands,
by Spear, Middleton Donaldson Hall
Attys.

Patented Sept. 10, 1929.

1,727,721

UNITED STATES PATENT OFFICE.

ERIC LANGLANDS AND GEORGE W. TOOMBS, OF WASHINGTON, DISTRICT OF COLUMBIA.

MOTOR VEHICLE.

Application filed April 2, 1927. Serial No. 180,572.

Our present invention relates to a motor vehicle of the type particularly adapted for the transportation of passengers and their baggage, although it is to be understood that the invention is in no wise to be limited thereto.

One of the principal objects of this invention is the provision of a self-contained power unit, capable of being used with many types of motor vehicles, and which may be readily removed from such vehicle for repair, replacement or the like without the use of cranes or the like.

Another important object is the provision, in a vehicle of the motor coach type, of individual baggage compartments in proximity to the individual seats, to wit, directly above the same, so that there will be no commingling of baggage, and upon stopping to discharge a passenger, it will not be necessary to remove all baggage from a single compartment in order to reach the particular piece wanted. This part of the invention contemplates a compartment for the baggage, accessible both from inside and outside the coach.

Still another important object is the arrangement of the engine or power plant in the rear of the whole assembly so that odors, engine noises and heat will not annoy passengers, and at the same time will allow the driver to sit directly at the front of the vehicle with his vision unobscured.

To this end, the invention contemplates an elongated body frame having a raised rear deck beneath which is housed the power assembly. This unit may advantageously be of the usual gas electric type. Such unit may be carried upon a main frame, and includes all the driving mechanism for connection to the driving axles. The engine and associated parts are carried on a sub-frame mounted on rollers which run on an irregularly shaped track, supported upon brackets carried by the main frame. In such a construction the engine or power assembly can be readily rolled out of the vehicle for repair or replacement.

The baggage is adapted to be carried in inside offset compartments, two walls of which are defined by the roof and one side of the body proper. These compartments are located directly above the passenger chairs and are either accessible from inside or outside the coach.

The coach is provided with two tiers of seats, a short series of steps connecting the two decks. The absence of the power plant from the immediate front of the vehicle enables the driver to sit directly at the front of the body which facilitates driving.

The invention further consists in the novel arrangement, combination and construction of parts herein shown and described.

Other objects and advantages will appear as the description proceeds and with reference to the accompanying drawings, diagrammatically illustrating the invention and in which:—

Fig. 3 is a longitudinal sectional elevation of the coach of Fig. 1.

Fig. 4 is a lateral sectional view through the forward or lower seating deck.

Fig. 5 is a plan view of a power truck and assembly.

Fig. 6 is a side elevation of Fig. 5.

Fig. 7 is a view partly in section along the line 7—7 of Fig. 5.

Fig. 8 is a view partly in section along the line 8—8 of Fig. 5.

Fig. 9 is a detail showing the rollers carried by the sub-frame and their relation to the track.

Fig. 10 is a figure on the line 10—10 of Fig. 7.

Fig. 16 is an enlarged elevation partly in section showing the track and roller arrangement.

Fig. 17 is a similar view but taken between main and sub-frames.

Fig. 18 is an enlarged detail of an engine lock.

Fig. 19 is an end view of a dolly looking from front to rear from the coach standpoint.

Figure 1:
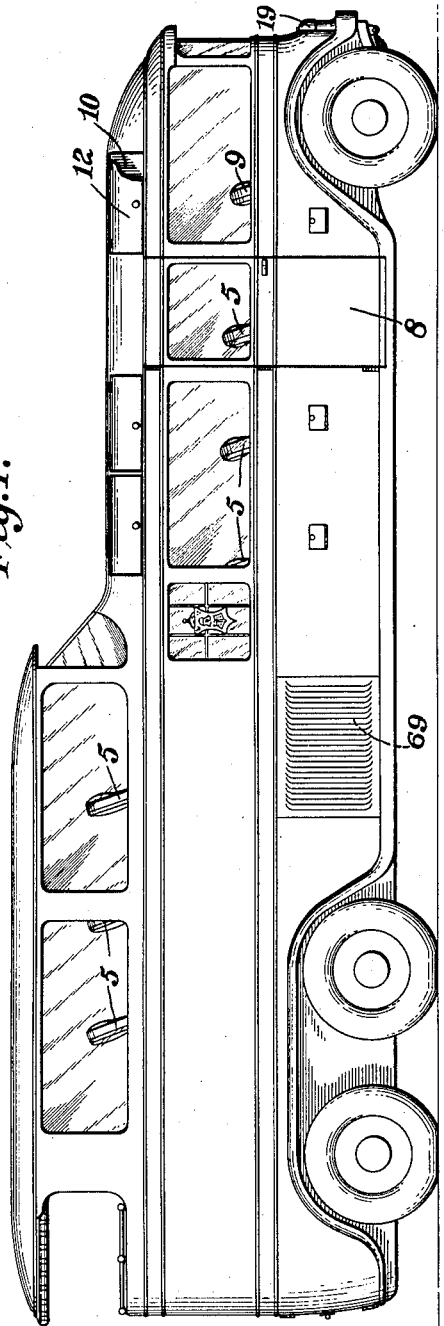
Fig. 1 is a side elevation of a coach constructed according to our invention.
Figure 2:
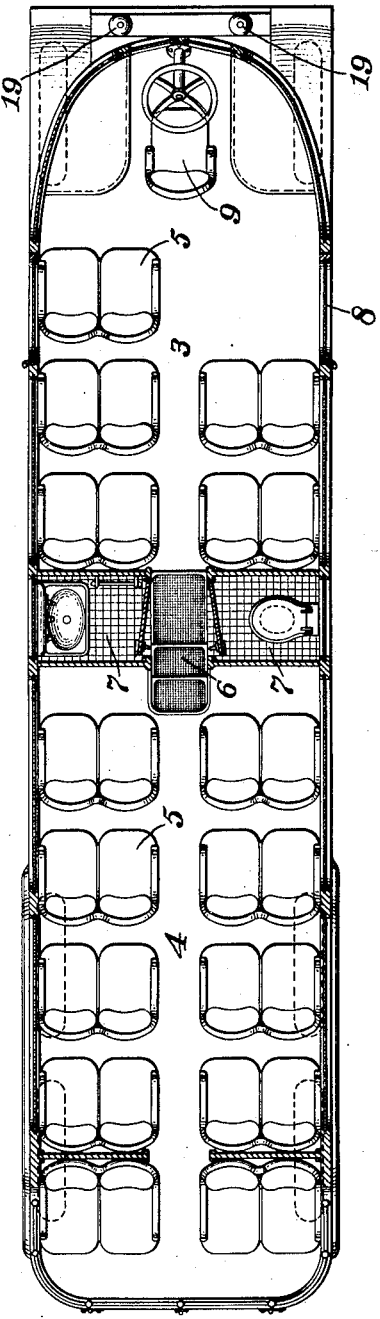
Fig. 2 is a plan view of the coach of Fig. 1 with the top removed.
Figure 11:
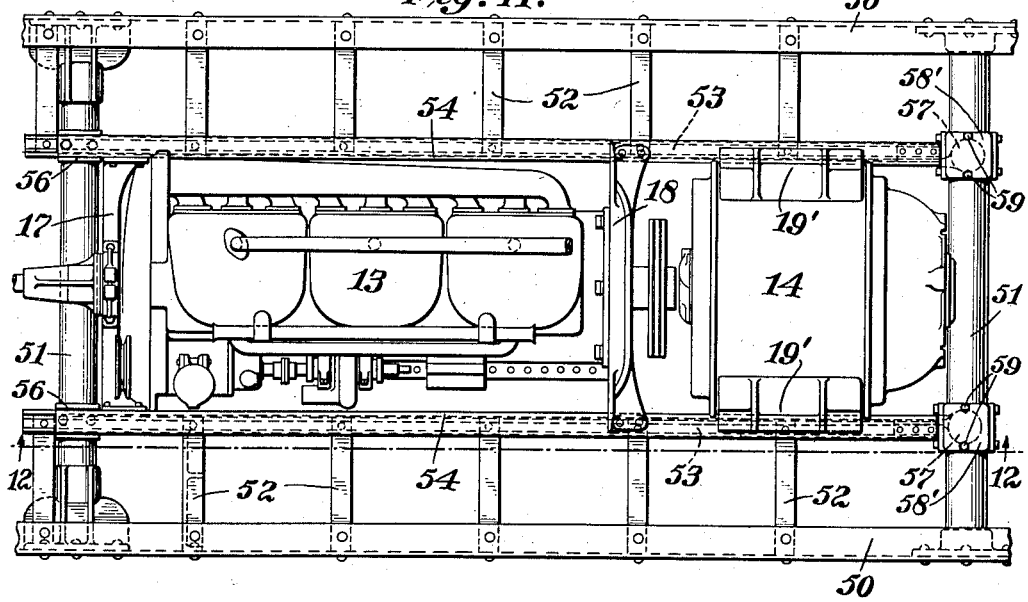
Fig. 11 is a plan view of a modified form of power assembly.
Figure 12:
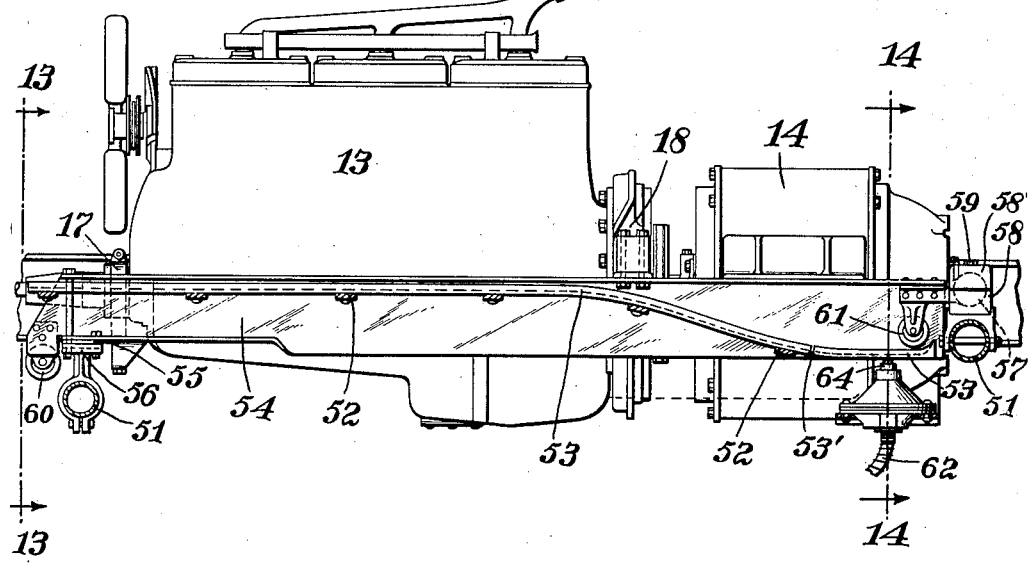
Fig. 12 is a sectional elevation along the line 12—12 of Fig. 11.
Figure 13:
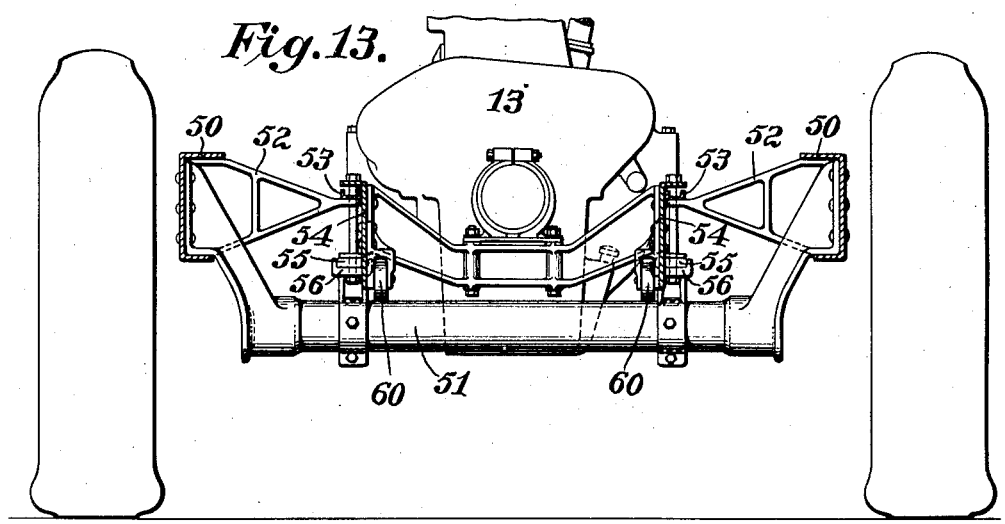
Fig. 13 is a view along the line 13—13 of Fig. 12.
Figure 14:
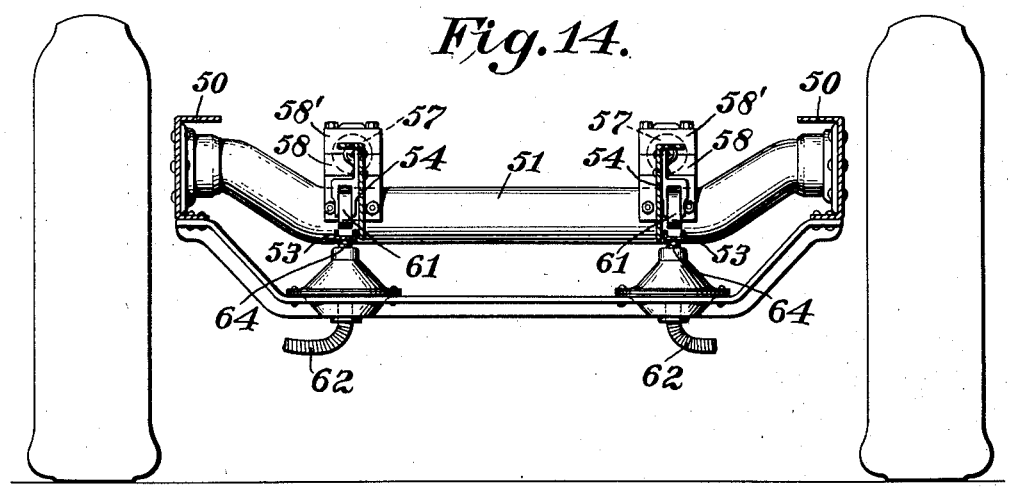
Fig. 14 is a view along the line 14—14 of Fig. 12.

In the embodiment of the invention shown, the vehicle body consists of two decks 3 and 4 each provided with a series of passenger seats 5. The rear deck 4 is raised above the level of the deck 3 and a short series of steps 6 connects them. On each side of the steps, and between the two decks, there may be provided toilet facilities. These rooms are indicated generally at 7.

The front of the body housing the rear deck 4 is to be glassed in so that an unobstructed forward view will be permitted to those occupying this part of the coach.

Where desirable, an open observation or smoking platform may be provided at the rear of the deck 4 and likewise furnished with seats.

A door 8 on the right side of the lower deck allows passengers to enter and exit therethrough.

A driver's seat 9 is provided directly at the front of the vehicle, where his view is unobstructed in all directions.

Directly above the individual seats, baggage compartments are provided, built to utilize this waste overhead space, and a portion of the top and side wall of the body. These compartments are indicated generally at 10 and access may be had thereto either through inside doors 11 or outside doors 12. Each compartment will ordinarily be large enough to carry the hand baggage of the passenger or passengers sitting directly beneath. By using such a construction and utilizing the outside doors 12, the driver may place or remove a passenger's baggage quickly and without inconveniencing the passenger or other passengers.

As above stated, the power plant is adapted to be located beneath the rear deck 4. This location has decided advantages over the front or usual place for such assemblies. In this case, the inconvenience accompanying the unavoidable heat, odors and noise is to a great extent eliminated, without detracting in any way from the efficiency of the power plant.

This power unit may consist of a gas engine 13, a generator 14, both of which are mounted on sub-frame 16, and one or more motors 15 suitably connected together in the usual manner. The motors 15 and the sub-frame are carried on transversals secured between the main frame parts 1 as will be more fully described hereinafter. Drive and driven wheels are provided in the usual manner and support the entire power assembly. It will thus be seen that the entire power plant and its truck may be disconnected from the vehicle.

Air springs may be used to cushion the truck in the usual manner and such pneumatic device is shown at 19, having one part pivoted to the truck or main frame 1 at 19$^a$ while the main portion of the device is attached to a bracket on the body as at 19$^b$. In this manner the coach body is resiliently supported upon the power truck.

The sub-frame consisting of longitudinals 16, cross braces 17 and 18 carrying the engine 13, and supporting members 19' upon which is mounted the generator 14, also carries outwardly extending brackets 20 and 21 at the front and rear, said brackets having rollers 22 and 23 respectively. Between the longitudinals 1 of the main frame, there is provided three offset transversals 24, 25 and 26 respectively used to permanently support the sub-frame, while the power assembly is in place, and the track or runway used to remove the assembly.

Built out from the transversals 24 and 26 are steps 27 and 28 respectively upon which the sub-frame is supported at each end. Upon these steps are mounted rubber pads 29 upon which the sub-frame directly rests so that this part is resiliently supported. Bolts 30 are adapted to pass through sub-frame 16 and step 27 and bolts 31 through step 28 to prevent displacement of the power plant. In like manner the intermediate transversal 25 is provided with supporting steps on which the sub-frame rests and to which it is bolted by bolts 32.

Longitudinal track ways 33 are mounted upon the transversals and above and outside the sub-frame supporting steps, and are adapted to receive the rollers 22 and 23. The track 33 is so shaped and arranged that it slopes irregularly up from front to rear, from the coach viewpoint, there being a slight change in level therein just behind each roller. This is indicated at 22$^a$ and 23$^a$.

In placing the sub-frame and its assembly in the truck, a dolly or the like may be used to transport the unit up to the point where the rollers will engage the track projecting beyond the rear transversal 26. After all four rollers are on the track, the whole sub-frame may be then pushed toward the front of the coach, until the rollers pass over the drops or changes in level 22$^a$ and 23$^a$. This drop is just sufficient to cause the bottom of the sub-frame to engage the rubber pads 29, the entire weight of the sub-frame being taken off the rollers at this point. The sub-frame must then be forced farther into place until the bolts 30, 31 and 32 can be put in place and the sub-frame secured. When it is desired to remove the sub-frame and its assembly, the operation is reversed. In such a case, the frame must be bodily dragged over the pads 29 until the rollers engage the track at 22ª and 23ª.

A retaining pad 34, adjustably secured as at 35 to the sub-frame may be used to prevent undue vibration and this holds the frame above and below resiliently.

In the modified form of arrangement as shown in Figs. 11 to 19 inclusive, the main frame consists of longitudinals 50 tied together by transversals 51 which may be conveniently of tubular stock and extending downwardly somewhat although not to the extent necessary in the first described arrangement.

Brackets 52 are secured to the members 50 and extend toward the center line of the coach and support the trackway 53.

As in the first described arrangement, the sub-frame consists of two longitudinals 54 normally supported on rubber cushions 55 held in socket elements 56 mounted on the rear main frame transversal 51. At the front of the sub-frame, the longitudinals are provided with ball members 57 attached thereto, and adapted to rest in a rubber socket 58 secured to the front transversal 51. A cap 58' is secured over the top of the ball 57 as by bolts 59 so that displacement will not occur. In this way the sub-frame is carried front and rear upon resilient supports. As before, this sub-frame carries the engine 13 upon members 17 and 18 and a connected generator 14 upon its carrying bracket 19'.

At the rear end of each sub-frame longitudinal, there is provided a roller 60 which hangs below and to one side of the member 56 carrying the rubber pad 55, while at the front, each longitudinal carries a roller 61 at a higher level than roller 60 and directly over but out of engagement with the trackway.

Figure 15:
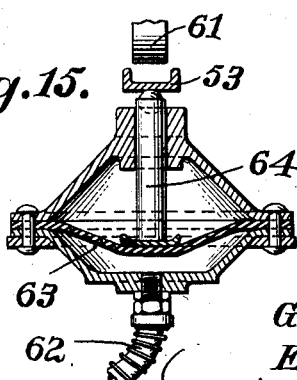
Fig. 15 is a sectional detail of the pneumatic lift device.

That portion of the trackway beneath the front roller 61 is hinged as at 53', so that upon admitting compressed air or other fluid through the line 62, the diaphragm 63 in the lifting device of Fig. 15 will cause the plunger 64 to engage the hinged end of the trackway 53. Further upward movement of the plunger will raise that end of the sub-frame as shown in Fig. 18, until the ball 57 leaves its socket. This end of the sub-frame is now free to move out.

A dolly indicated generally at 65 mounted upon casters 66 and having trackways 67 and 68 is then rolled up to the rear of the coach so that the short trackway 68 underlies the projecting end of the trackway 53. When the dolly is in this position, the lower long trackway 67 will underlie and raise the rollers 60. The entire sub-frame and its assembly may then be rolled rearwardly onto the dolly and removed from the truck for repair or otherwise. When completely out of the truck, the front rollers 61 will rest on the short upper trackway 68 of the dolly and the rear rollers 60 on the long upper level of the dolly trackway 67. In this way the level of the engine and sub-frame is maintained.

In both forms of the device, the engine radiator may be conveniently located in the side wall of the body as at 69 and hose connections 70 used between radiator and engine.

The usual controls, not shown, are provided for the driver.

With such a construction and arrangement, it is a comparatively simple matter to remove the engine from the truck for repair or replacement without laying up either the truck or vehicle, as the major portion of breakdowns occur in the gas engine. This replacement can readily be accomplished without the aid of cranes or the like, as the engine and its frame can be slid and rolled out onto a suitable dolly or table arranged with tracks at the same height as hereinbefore described.

Where other parts of the power system require replacement the entire truck may be advantageously removed by disconnecting a few minor parts after jacking up the vehicle body.

We claim:

1. A motor vehicle comprising a body having two passenger carrying decks, one at a higher level than the other, and a removable power plant mounted on a truck beneath the raised deck.

2. A motor vehicle comprising a body having two passenger carrying decks, one at a higher level than the other, and a removable power plant mounted on a truck beneath the raised deck, the rear portion of the body permitting withdrawing of the truck in a rearwardly direction.

3. A motor vehicle having a power plant including an engine, a main frame for the power plant, a track carried thereby, said track being on a lower level at the front than at the rear thereof, a sub-frame carrying the engine, and rollers on said sub-frame engaging said track whereby the engine and its sub-frame may be rolled from the main power plant frame.

4. A motor vehicle having a power plant including an engine, a main frame for the power plant, a track carried thereby, an engine sub-frame, rollers on the engine sub-frame engaging said track, said track being so shaped as to automatically cause the rollers to disengage the track by movement of the engine frame over the track.

5. A motor vehicle having a power plant including an engine, a main frame for the power plant, a track carried thereby, an engine sub-frame, rollers and a resilient stop on the engine frame, said rollers engaging the track through part movement of the engine sub-frame over the main truck frame, said stop engaging the track through the remainder of such movement.

6. A motor vehicle having a power plant including an engine, a main frame for the power plant, a trackway carried thereby, an engine sub-frame having rollers normally out of engagement with said track, and means to cause the track to engage said rollers.

7. A motor vehicle having a power plant including an engine, a main frame for the power plant, a trackway carried thereby, an engine sub-frame having rollers normally out of engagement with said track, and means to cause the track to engage said rollers, said trackway including a hinged portion.

8. A motor vehicle having a power plant including an engine, a main frame for the power plant, a trackway carried thereby, an engine sub-frame having rollers normally out of engagement with said track, and means to cause the track to engage said rollers, said trackway including a hinged portion, said engagement causing means comprising a vertically movable plunger located beneath the hinged portion of the track.

9. In combination a motor vehicle having a power plant including an engine, a main frame for the power plant, a track carried thereby, a sub-frame carrying the engine, and rollers on said sub-frame engaging said track whereby the engine and its sub-frame may be rolled from the main power plant frame, additional rollers on said subframe out of engagement with said track and a dolly having complementary trackways to receive all the said rollers when they leave the frame track.

10. In combination a motor vehicle having a power plant including an engine, a main frame for the power plant, a track carried thereby, a sub-frame carrying the engine, and rollers on said sub-frame engaging said track whereby the engine and its sub-frame may be rolled from the main power plant frame, said rollers comprising two pairs, one pair of which engage the trackway, the other pair projecting below the main frame trackway, and a dolly for receiving the last mentioned rollers to support the sub-frame while it is being removed from the main frame, and a trackway on the dolly to receive the first mentioned rollers when they leave the main frame trackway.

In testimony whereof, we affix our signatures.

ERIC LANGLANDS.
GEORGE W. TOOMBS.